(12) United States Patent
Geisner et al.

(10) Patent No.: US 8,145,594 B2
(45) Date of Patent: Mar. 27, 2012

(54) LOCALIZED GESTURE AGGREGATION

(75) Inventors: Kevin Geisner, Seattle, WA (US);
Stephen Latta, Seattle, WA (US);
Gregory N. Snook, Sammamish, WA (US); Relja Markovic, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 12/474,581

(22) Filed: May 29, 2009

(65) Prior Publication Data
US 2010/0306261 A1 Dec. 2, 2010

(51) Int. Cl.
*G06F 17/30* (2006.01)
(52) U.S. Cl. ....................................... 707/607
(58) Field of Classification Search ............... 707/2, 3, 707/104.1, 607; 348/14.16
See application file for complete search history.

(56) References Cited

U.S. PATENT DOCUMENTS

| | | | |
|---|---|---|---|
| 6,057,909 A | 5/2000 | Yahav et al. | |
| 6,100,517 A | 8/2000 | Yahav et al. | |
| 6,256,033 B1 | 7/2001 | Nguyen | |
| 6,498,628 B2 | 12/2002 | Iwamura | |
| 6,502,515 B2 | 1/2003 | Burckhardt et al. | |
| 6,512,838 B1 | 1/2003 | Rafii et al. | |
| 6,539,931 B2 | 4/2003 | Trajkovic et al. | |
| 6,674,877 B1 | 1/2004 | Jojic et al. | |
| 6,771,277 B2 | 8/2004 | Ohba | |
| 6,950,534 B2 | 9/2005 | Cohen et al. | |
| 7,006,236 B2 | 2/2006 | Tomasi et al. | |
| 7,050,177 B2 | 5/2006 | Tomasi et al. | |
| 7,151,530 B2 | 12/2006 | Roeber et al. | |
| 7,224,384 B1 | 5/2007 | Iddan et al. | |
| 7,227,526 B2 | 6/2007 | Hildreth et al. | |
| 7,293,356 B2 | 11/2007 | Sohn et al. | |
| 7,308,112 B2 | 12/2007 | Fujimura et al. | |
| 7,310,431 B2 | 12/2007 | Gokturk et al. | |
| 7,317,836 B2 | 1/2008 | Fujimura et al. | |
| 7,340,077 B2 | 3/2008 | Gokturk et al. | |
| 7,367,887 B2 | 5/2008 | Watabe et al. | |
| 7,590,262 B2 | 9/2009 | Fujimura et al. | |
| 2004/0207597 A1 | 10/2004 | Marks | |
| 2005/0055628 A1 | 3/2005 | Chen | |

(Continued)

FOREIGN PATENT DOCUMENTS

WO    WO 99/15863 A1    4/1999

(Continued)

OTHER PUBLICATIONS

Cao, X. et al., "Evaluation of an On-Line Adaptive Gesture Interface with Command Prediction", http://dgp.toronto.edu, Downloaded from Internet Feb. 13, 2009, 8 pages.

(Continued)

*Primary Examiner* — Etienne Leroux
(74) *Attorney, Agent, or Firm* — Woodcock Washburn LLP

(57) ABSTRACT

Systems, methods and computer readable media are disclosed for a localized gesture aggregation. In a system where user movement is captured by a capture device to provide gesture input to the system, demographic information regarding users as well as data corresponding to how those users respectively make various gestures is gathered. When a new user begins to use the system, his demographic information is analyzed to determine a most likely way that he will attempt to make or find it easy to make a given gesture. That most likely way is then used to process the new user's gesture input.

19 Claims, 13 Drawing Sheets

U.S. PATENT DOCUMENTS

| | | |
|---|---|---|
| 2005/0059488 A1 | 3/2005 | Larsen et al. |
| 2006/0188144 A1 | 8/2006 | Sasaki et al. |
| 2006/0239558 A1 | 10/2006 | Rafii et al. |
| 2007/0013718 A1 | 1/2007 | Ohba |
| 2007/0060336 A1 | 3/2007 | Marks et al. |
| 2007/0098222 A1 | 5/2007 | Porter et al. |
| 2007/0216894 A1 | 9/2007 | Garcia et al. |
| 2007/0259717 A1 | 11/2007 | Mattice |
| 2007/0260984 A1 | 11/2007 | Marks et al. |
| 2007/0263932 A1 | 11/2007 | Bernardin |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0046425 A1 | 2/2008 | Perski |
| 2008/0059578 A1 | 3/2008 | Albertson |
| 2008/0062257 A1 | 3/2008 | Corson |
| 2008/0100620 A1 | 5/2008 | Nagai et al. |
| 2008/0126937 A1 | 5/2008 | Pachet |
| 2008/0134102 A1 | 6/2008 | Movold et al. |
| 2008/0152191 A1 | 6/2008 | Fujimura et al. |
| 2008/0170776 A1 | 7/2008 | Albertson |
| 2008/0215972 A1 | 9/2008 | Zalewski et al. |
| 2008/0215973 A1 | 9/2008 | Zalewski et al. |
| 2009/0079816 A1 * | 3/2009 | Qvarfordt et al. .......... 348/14.16 |
| 2009/0141933 A1 | 6/2009 | Wagg |
| 2009/0167679 A1 | 7/2009 | Klier et al. |
| 2009/0221368 A1 | 9/2009 | Yen et al. |

FOREIGN PATENT DOCUMENTS

| | | |
|---|---|---|
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |

OTHER PUBLICATIONS

UI Gestures Collector Infrastructure, Overview (UI Gestures Collector Infrastructure), http://bits.netbeans.org, Built on Feb. 3, 2009, 3 pages.

Qian et al., "A Gesture-Driven Multimodal Interactive Dance System", IEEE International Conference on Multimedia and Expo, Taipei, Jun. 3, 2004, 1579-1582.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

* cited by examiner

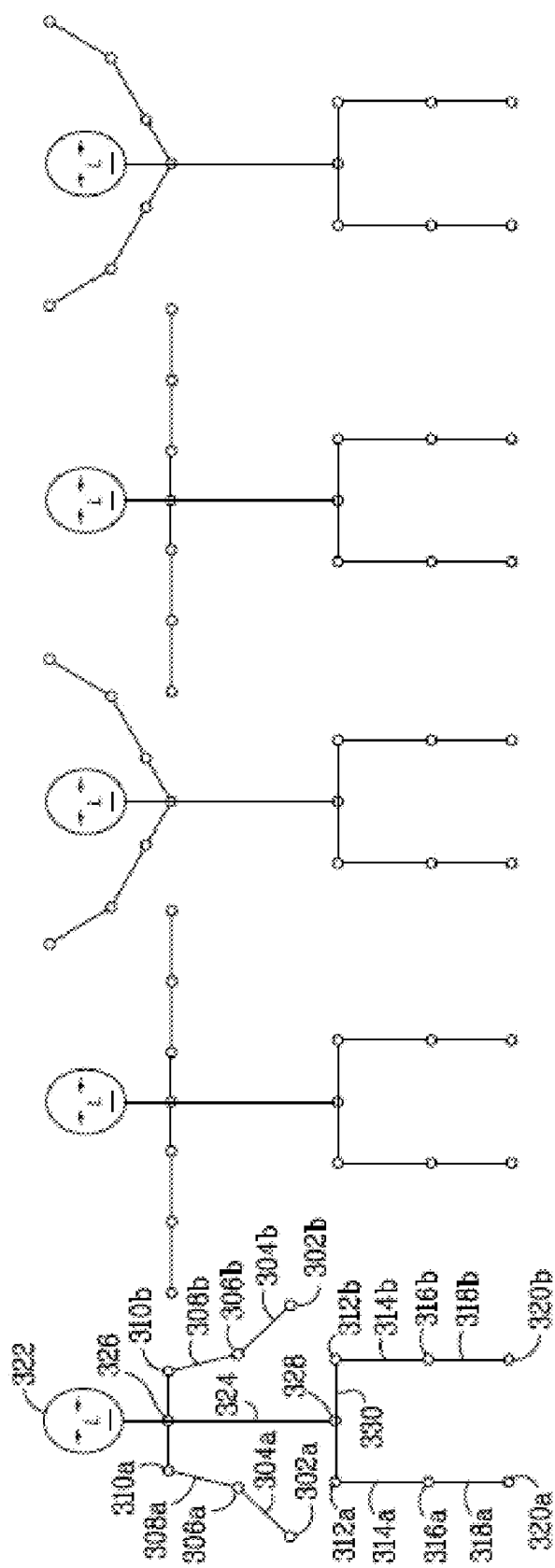

LOCALIZED GESTURE AGGREGATION

BACKGROUND OF THE INVENTION

Many computing applications such as computer games, multimedia applications, office applications or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY OF THE INVENTION

Disclosed herein are systems and methods for, in a computing system that accepts user input through user-performed gestures that are captured by a capture device, determining how the user is likely to initially attempt to perform gestures or to find it easy to perform gestures and adjust the recognition of user-performed gestures accordingly.

In an embodiment, a recognizer engine comprises a base recognizer engine and at least one filter. A filter comprises a information about a gesture and may comprise at least one corresponding parameter. The recognizer engine provides to an application a filter and receives from that application at least one parameter that specifies the particulars of how that gesture is to be recognized by the recognizer engine.

The recognizer engine receives a series of image data from a camera. This camera may comprise a color camera (such as red-green-blue or RGB), a depth camera, and/or a three-dimensional (3D) camera. This data may comprise separate depth and color images, a combined image that incorporates depth and color information, or a parsed image where objects are identified, such as people that are skeletal mapped. This data captures motions or poses made by at least one user. Based on this image data, the recognizer engine is able to parse gestures that the user intends to convey. The recognizer engine detects the likelihood that the user has conveyed a gesture, and that the user has satisfied any parameters, either default or application-determined, associated with the gesture for the application. The recognizer engine then sends the confidence level that this has occurred to the application. In sending this confidence level, the recognizer engine may also send the application specifics of how the user conveyed the gesture for further processing by the application.

Where the user is new to the system, he may attempt to perform a gesture in a particular way, or find it easy to learn a gesture performed in a particular way. Demographic information that the user supplies (e.g. age, nationality, sex), or is otherwise known about him (e.g. his location as determined by his internet protocol (IP) address) after opting-in to such information gathering may be used to determine the user's inclination. This may be compared to a collection of other users' demographic information and the way that they are inclined to perform gestures to determine a most likely way that the user will be inclined to perform a gesture. The gesture recognizer engine may then be modified to favor determining that gestures performed in this most likely way have been performed. This feature is referred to herein generally as localized gesture aggregation, in that information about how groups of users are inclined or predisposed to perform gestures is aggregated, such as by groups based on physical location.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

Systems, methods, and computer readable media for localized gesture aggregation in accordance with this specification are further described with reference to the accompanying drawings in which:

FIGS. 7A, 7B, 7C, 7D, and 7E illustrate the example "fair catch" gesture of FIGS. 6A-E as each frame of image data has been parsed to produce a skeletal map of the user.

DETAILED DESCRIPTION OF ILLUSTRATIVE EMBODIMENTS

A user may control an application executing on a computing environment such as a game console, a computer, or the like by performing one or more gestures. According to one embodiment, the gestures may be received by, for example, a capture device. For example, the capture device may capture a depth image of a scene. In one embodiment, the capture device may determine whether one or more targets or objects in the scene corresponds to a human target such as the user. To determine whether a target or object in the scene corresponds a human target, each of the targets may be flood filled and compared to a pattern of a human body model. Each target or object that matches the human body model may then be scanned to generate a skeletal model associated therewith. The skeletal model may then be provided to the computing environment such that the computing environment may track the skeletal model, render an avatar associated with the skeletal model, and may determine which controls to perform in an application executing on the computer environment based on, for example, gestures of the user that have been recognized from the skeletal model. A gesture recognizer engine, the architecture of which is described more fully below, is used to determine when a particular gesture has been made by the user.

Figure 1A:
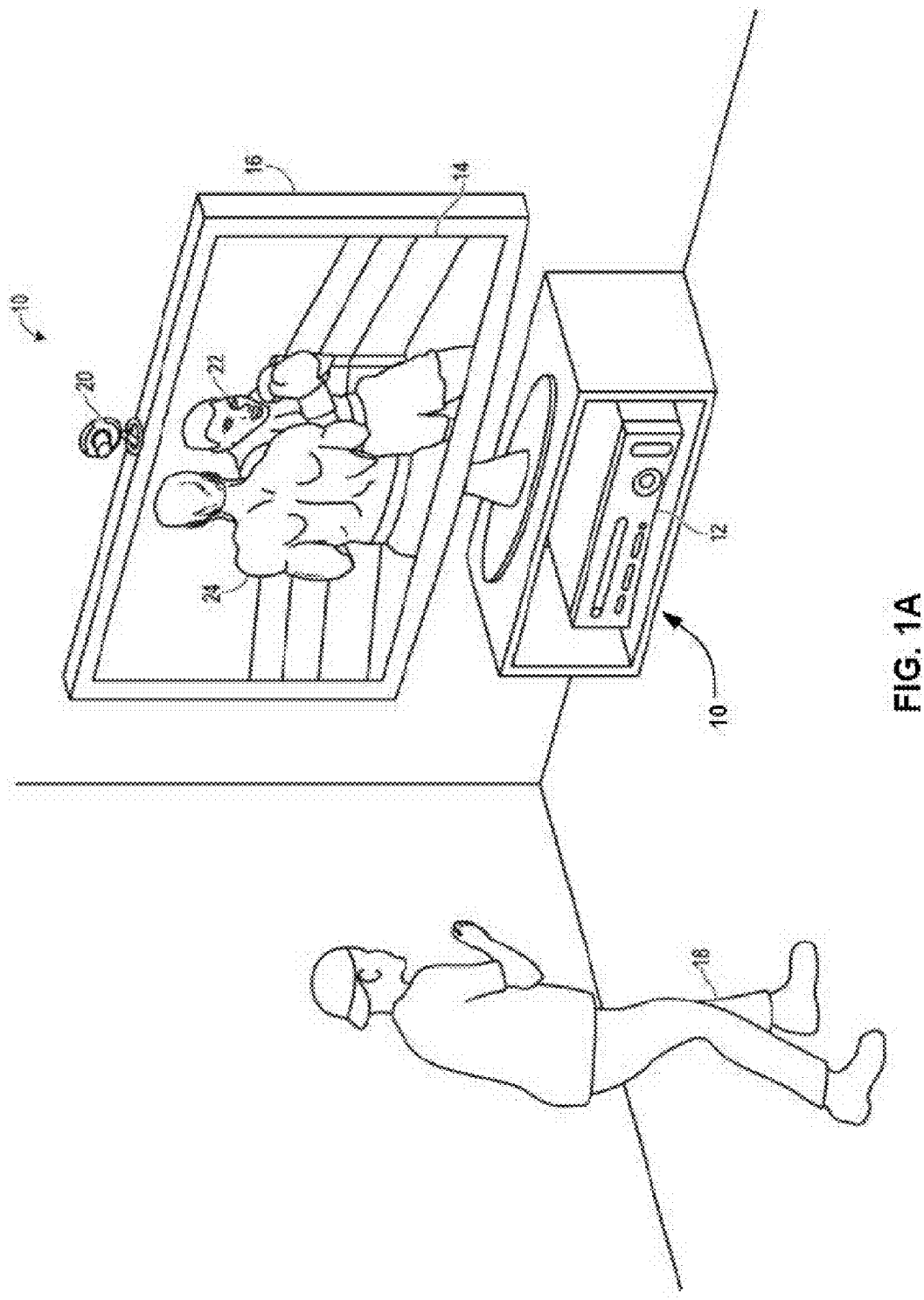
FIGS. 1A and 1B illustrate an example embodiment of a target recognition, analysis, and tracking system with a user playing a game.
Figure 1B:
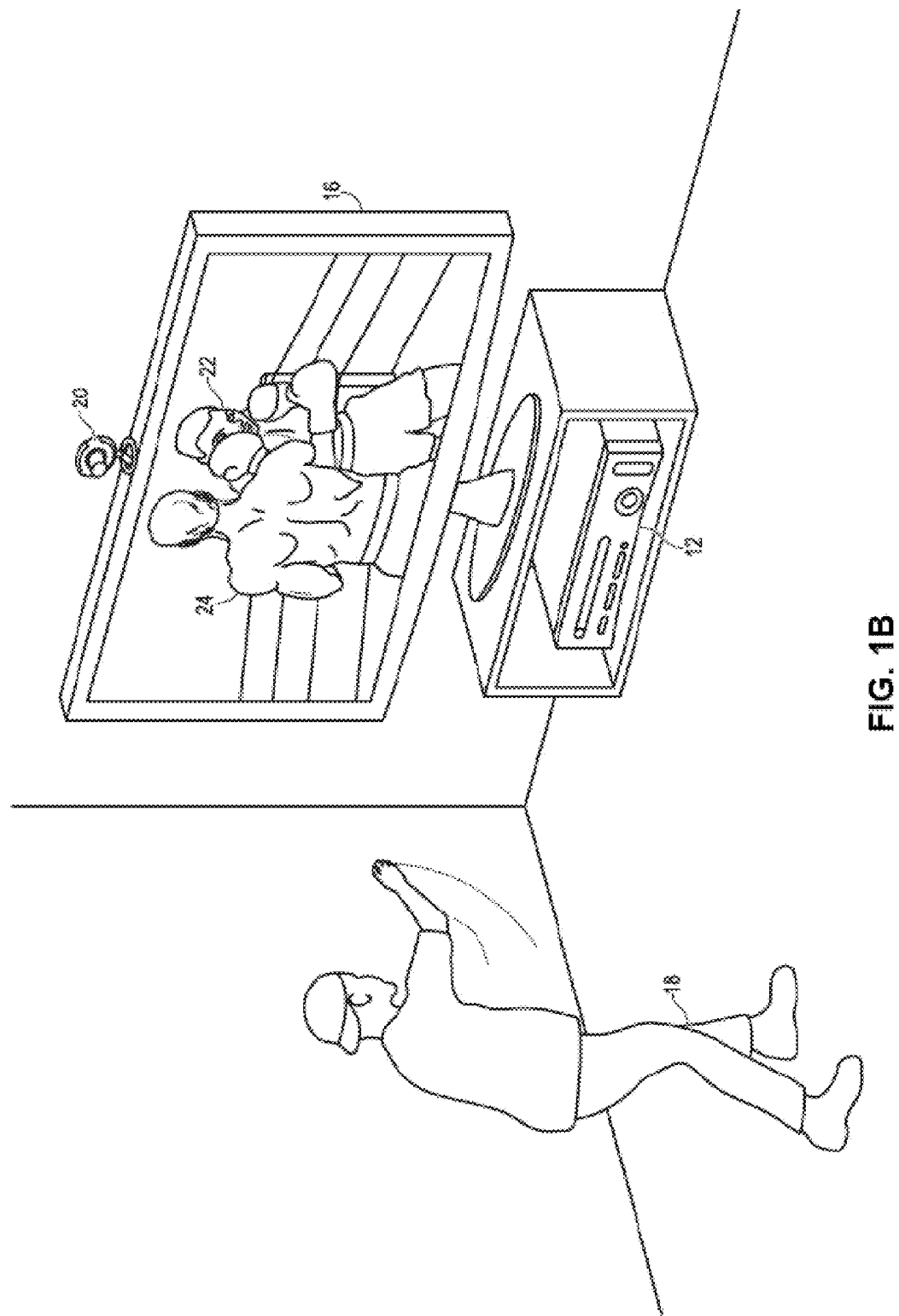

FIGS. 1A and 1B illustrate an example embodiment of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the target recognition, analysis, and tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computer environment 12. Thus, according to one embodiment, the user 18 may move his or her body to control the application.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 22 to the user 18. The computing environment 12 may also use the audiovisual device 16 to provide a visual representation of a player avatar 24 that the user 18 may control with his or her movements. For example, as shown in FIG. 1B, the user 18 may throw a punch in physical space to cause the player avatar 24 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 24 in game space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 24. For example, the player may use movements to end, pause, or save a game, select a level, view high scores, communicate with a friend, etc.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
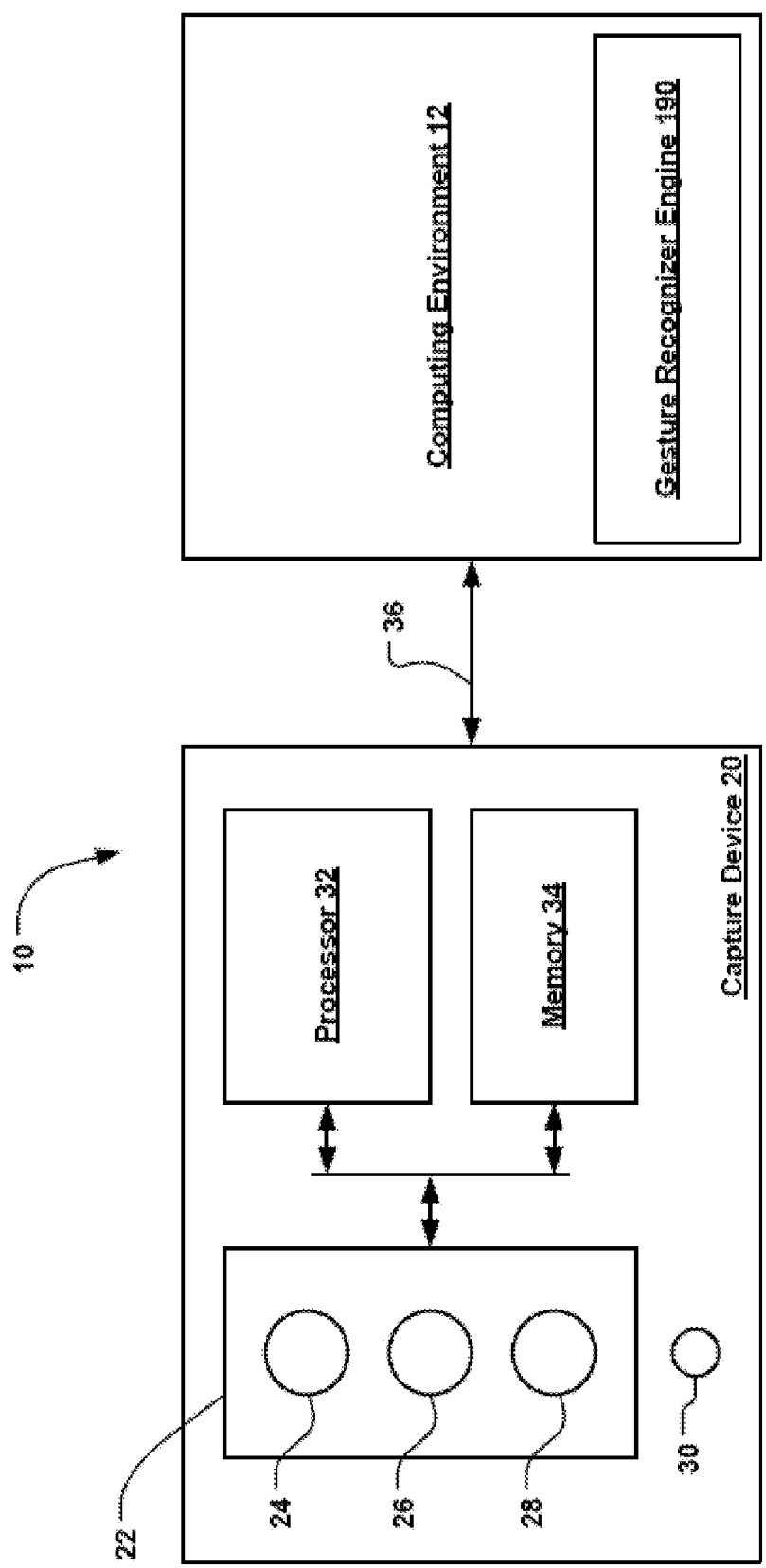
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, recognize user gestures and in response control an application such as a game or word processor. For example, as shown, in FIG. 2, the computing environment 12 may include a gestures recognizer engine 190. The gestures recognizer engine 190 may include a collection of gesture filters, each comprising information concerning a gesture that may be performed by the skeletal model (as the user moves). The data captured by the cameras 26, 28 and device 20 in the form of the skeletal model and movements associated with it may be compared to the gesture filters in the gesture recognizer engine 190 to identify when a user (as represented by the skeletal model) has performed one or more gestures. Those gestures may be associated with various controls of an application. Thus, the computing environment 12 may use the gesture recognizer engine 190 to interpret movements of the skeletal model and to control an application based on the movements.

Figure 3A:
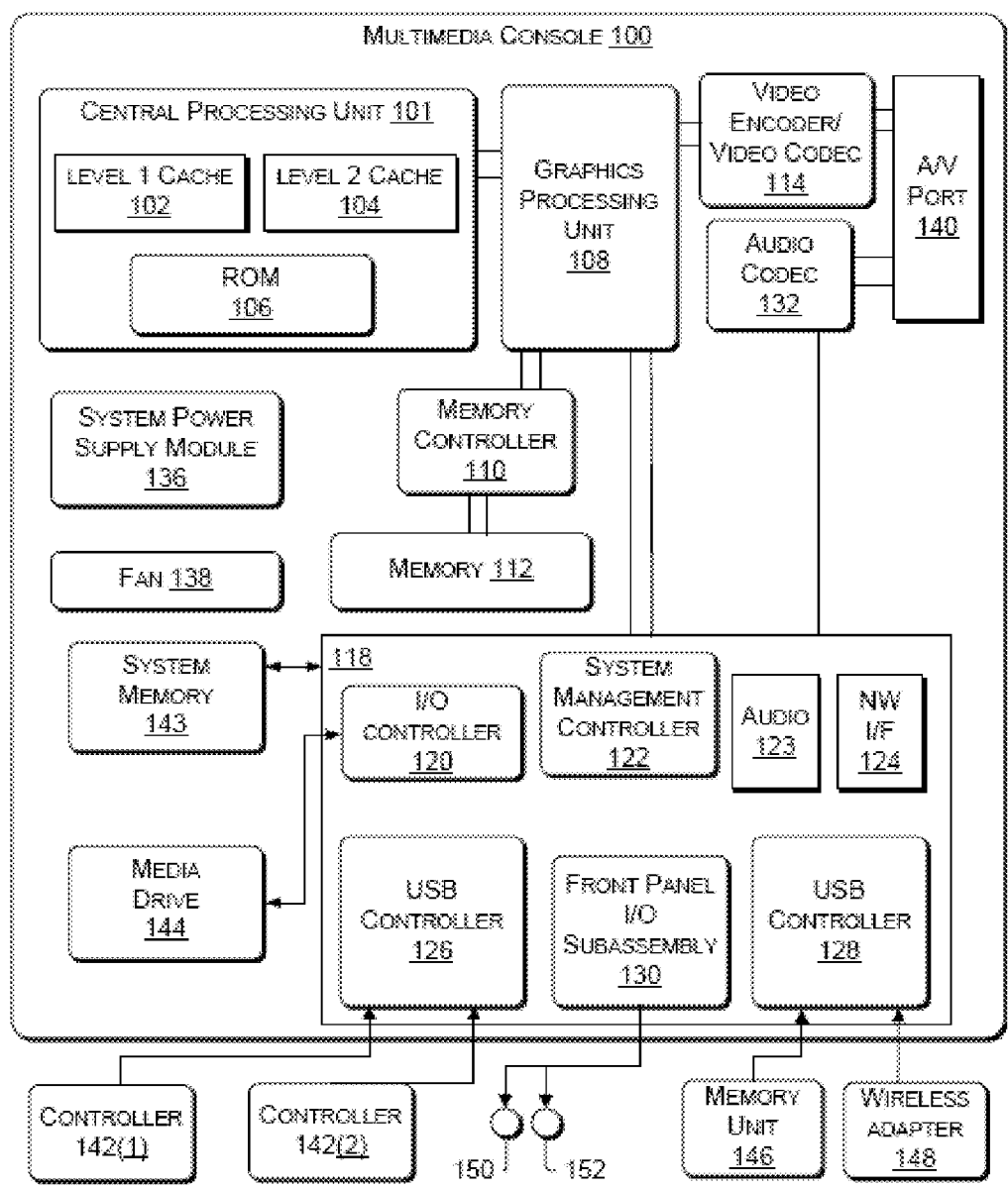
FIG. 3A illustrates an example embodiment of a computing environment that may be used to interpret one or more gestures in a target recognition, analysis, and tracking system.

FIG. 3A illustrates an example embodiment of a computing environment that may be used to implement computing environment 12 of FIGS. 1A-2. In this example embodiment, the computing environment 12 comprises a multimedia console 100, such as a gaming console. As shown in FIG. 3A, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 3B:
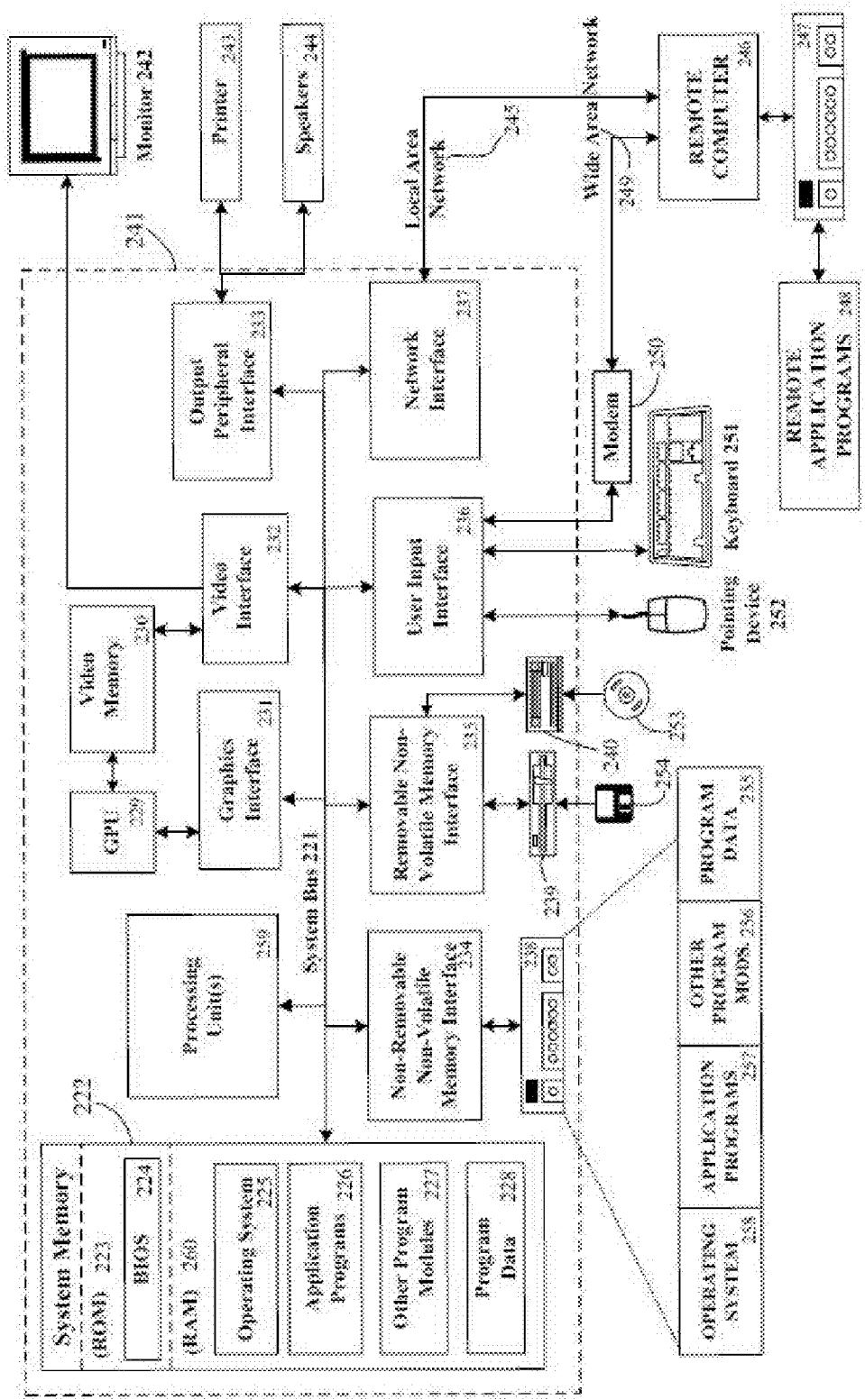
FIG. 3B illustrates another example embodiment of a computing environment that may be used to interpret one or more gestures in a target recognition, analysis, and tracking system.

FIG. 3B illustrates another example embodiment of a computing environment 220 that may be used to implement the computing environment 12 shown in FIGS. 1A-2. The computing environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4A:
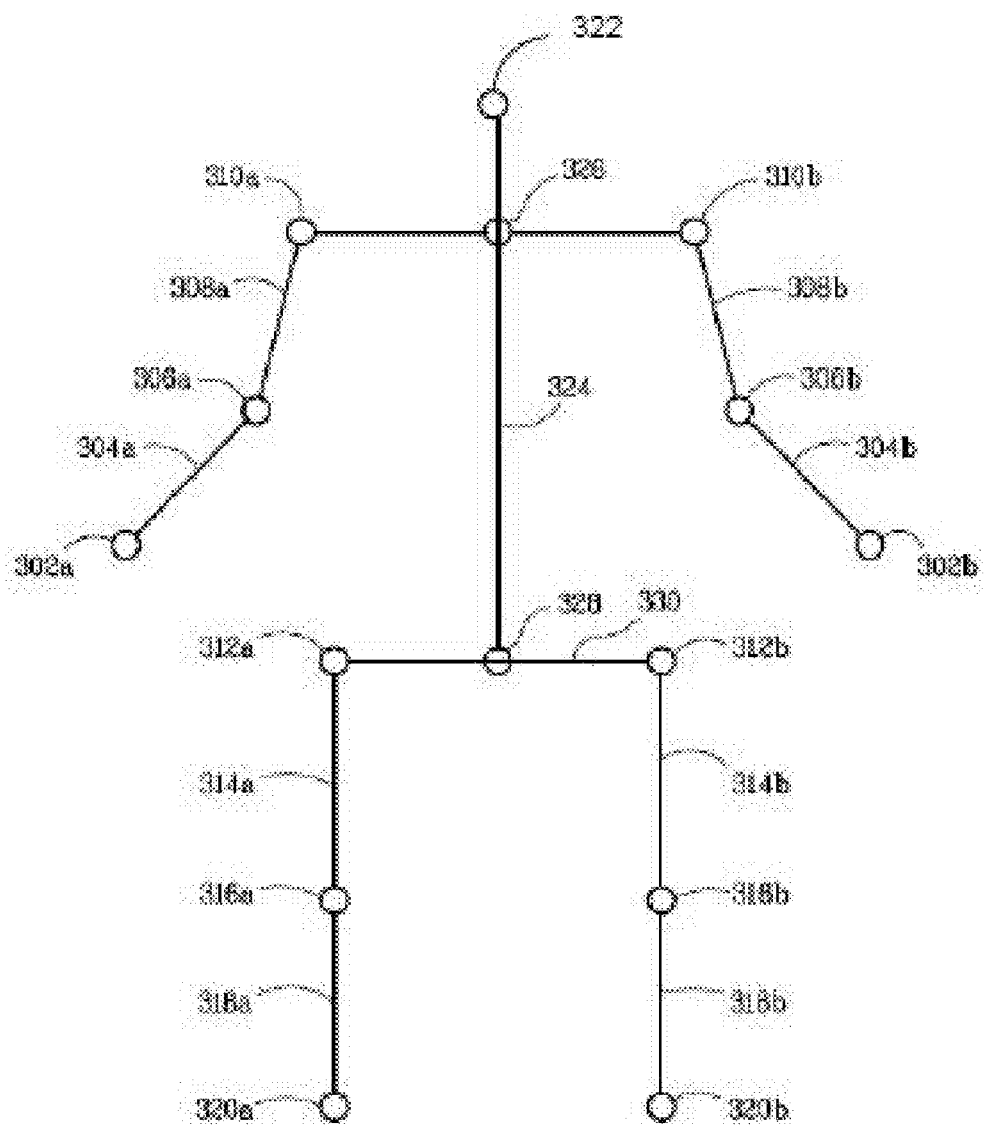
FIG. 4A illustrates a skeletal mapping of a user that has been generated from the target recognition, analysis, and tracking system of FIG. 2.

FIG. 4A depicts an example skeletal mapping of a user that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the torso 324, the top 326 and bottom 328 of the spine, and the waist 330. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 304 in front of his torso 324. A gesture may also incorporate props, such as by swinging a mock sword. A gesture may comprise more than one body part, such as clapping the hands 302 together, or a subtler motion, such as pursing one's lips.

Gestures may be used for input in a general computing context. For instance, various motions of the hands 302 or other body parts may correspond to common system wide tasks such as navigate up or down in a hierarchical list, open a file, close a file, and save a file. Gestures may also be used in a video-game-specific context, depending on the game. For instance, with a driving game, various motions of the hands 302 and feet 320 may correspond to steering a vehicle in a direction, shifting gears, accelerating, and breaking.

A user may generate a gesture that corresponds to walking or running, by walking or running in place himself The user may alternately lift and drop each leg 312-320 to mimic walking without moving. The system may parse this gesture by analyzing each hip 312 and each thigh 314. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 320 leave the ground entirely. The system may parse the skeleton for this gesture by analyzing the angle relation of the shoulders 310, hips 312 and knees 316 to see if they are in a position of alignment equal to standing up straight. Then these points and upper 326 and lower 328 spine points may be monitored for any upward acceleration. A sufficient combination of acceleration may trigger a jump gesture.

Given this "heel lift jump" gesture, an application may set values for parameters associated with this gesture. The parameters may include the above acceleration threshold, which determines how fast some combination of the user's shoulders 310, hips 312 and knees 316 must move upward to trigger the gesture, as well as a maximum angle of alignment between the shoulders 310, hips 312 and knees 316 at which a jump may still be triggered.

The outputs may comprise a confidence level, as well as the user's body angle at the time of the jump.

Setting parameters for a gesture based on the particulars of the application that will receive the gesture is important in accurately identifying gestures. Properly identifying gestures and the intent of a user greatly helps in creating a positive user experience. Where a gesture recognizer system is too sensitive, and even a slight forward motion of the hand 302 is interpreted as a throw, the user may become frustrated because gestures are being recognized where he has no intent to make a gesture, and thus, he lacks control over the system. Where a gesture recognizer system is not sensitive enough, the system may not recognize conscious attempts by the user to make a throwing gesture, frustrating him in a similar manner. At either end of the sensitivity spectrum, the user becomes frustrated because he cannot properly provide input to the system.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 302-310 to full length while making the grab gesture. In this situation, a similar grab gesture where the user only partially extends his arm 302-310 may not achieve the result of interacting with the ball.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 310*a*, and on the same side of the head 322 as the throwing arm 302*a*-310*a*. It may not be necessary to define all bounds of a volume, such as with this throwing gesture, where an outer bound away from the body is left undefined, and the volume extends out indefinitely, or to the edge of scene that is being monitored.

Figure 4B:
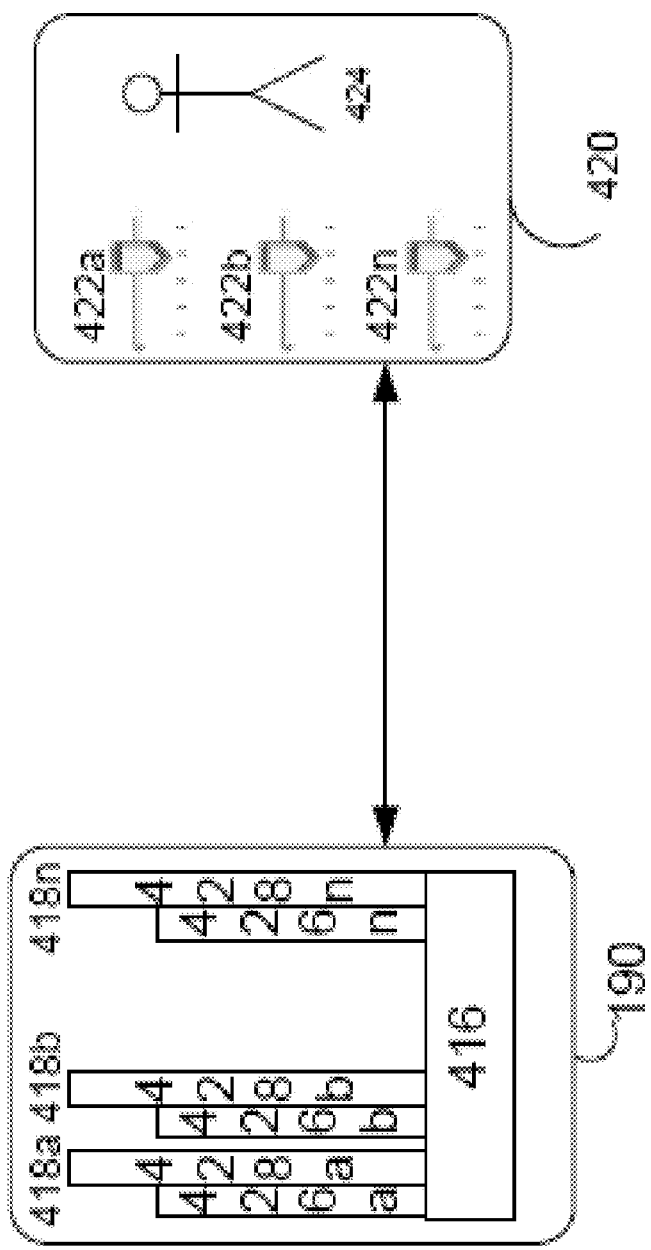
FIG. 4B illustrates further details of the gesture recognizer architecture shown in FIG. 2.

FIG. 4B provides further details of one exemplary embodiment of the gesture recognizer engine 190 of FIG. 2. As shown, the gesture recognizer engine 190 may comprise at least one filter 418 to determine a gesture or gestures. A filter 418 comprises information defining a gesture 426 (hereinafter referred to as a "gesture") along with parameters 428, or metadata, for that gesture. For instance, a throw, which comprises motion of one of the hands from behind the rear of the body to past the front of the body, may be implemented as a gesture 426 comprising information representing the movement of one of the hands of the user from behind the rear of the body to past the front of the body, as that movement would be captured by the depth camera. Parameters 428 may then be set for that gesture 426. Where the gesture 426 is a throw, a parameter 428 may be a threshold velocity that the hand has to reach, a distance the hand must travel (either absolute, or relative to the size of the user as a whole), and a confidence rating by the recognizer engine that the gesture occurred. These parameters 428 for the gesture 426 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

A context may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-person shooter game that involves operating a motor vehicle. While the user is on foot, making a fist with the fingers towards the ground and extending the fist in front and away from the body may represent a punching gesture. While the user is in the driving context, that same motion may represent a "gear shifting" gesture. There may also be one or more menu environments, where the user can save his game, select among his character's equipment or perform similar actions that do not comprise direct game-play. In that environment, this same gesture may have a third meaning, such as to select something or to advance to another screen.

The gesture recognizer engine 190 may have a base recognizer engine 416 that provides functionality to a gesture filter 418. In an embodiment, the functionality that the recognizer engine 416 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 418 may be loaded and implemented on top of the base recognizer engine 416 and may utilize services provided by the engine 416 to all filters 418. In an embodiment, the base recognizer engine 416 processes received data to determine whether it meets the requirements of any filter 418. Since these provided services, such as parsing the input, are provided once by the base recognizer engine 416 rather than by each filter 418, such a service need only be processed once in a period of time as opposed to once per filter 418 for that period, so the processing required to determine gestures is reduced.

An application may use the filters 418 provided by the recognizer engine 190, or it may provide its own filter 418, which plugs in to the base recognizer engine 416. In an embodiment, all filters 418 have a common interface to enable this plug-in characteristic. Further, all filters 418 may utilize parameters 428, so a single gesture tool as described below may be used to debug and tune the entire filter system 418.

These parameters 428 may be tuned for an application or a context of an application by a gesture tool 420. In an embodiment, the gesture tool 420 comprises a plurality of sliders 422, each slider 422 corresponding to a parameter 428, as well as a pictoral representation of a body 424. As a parameter 428 is adjusted with a corresponding slider 422, the body 424 may demonstrate both actions that would be recognized as the gesture with those parameters 428 and actions that would not be recognized as the gesture with those parameters 428, identified as such. This visualization of the parameters 428 of gestures provides an effective means to both debug and fine tune a gesture.

FIG. 5 depicts more complex gestures or filters 418 created from stacked gestures or filters 418. Gestures can stack on each other. That is, more than one gesture may be expressed by a user at a single time. For instance, rather than disallowing any input but a throw when a throwing gesture is made, or requiring that a user remain motionless save for the components of the gesture (e.g. stand still while making a throwing gesture that involves only one arm). Where gestures stack, a user may make a jumping gesture and a throwing gesture simultaneously, and both of these gestures will be recognized by the gesture engine.

Figure 5A:
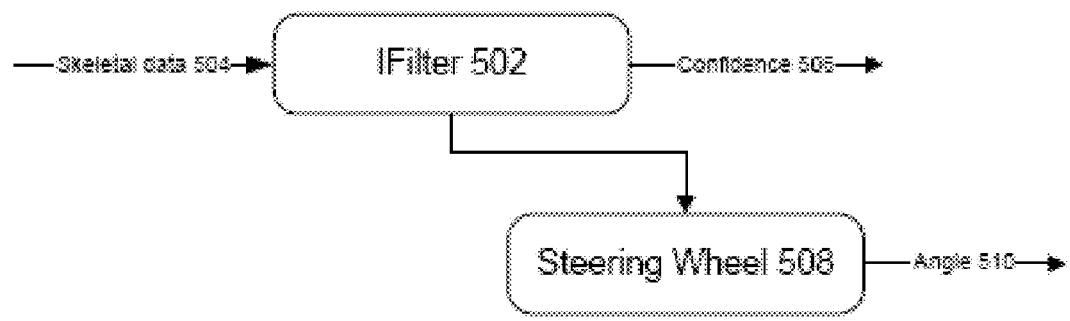
FIGS. 5A and 5B illustrate how gesture filters may be stacked to create more complex gesture filters.

FIG. 5A depicts a simple gesture filter 418 according to the stacking paradigm. The IFilter filter 502 is a basic filter 418 that may be used in every gesture filter. IFilter 502 takes user position data 504 and outputs a confidence level 506 that a gesture has occurred. It also feeds that position data 504 into a SteeringWheel filter 508 that takes it as an input and outputs an angle to which the user is steering (e.g. 40 degrees to the right of the user's current bearing) 510.

Figure 5B:
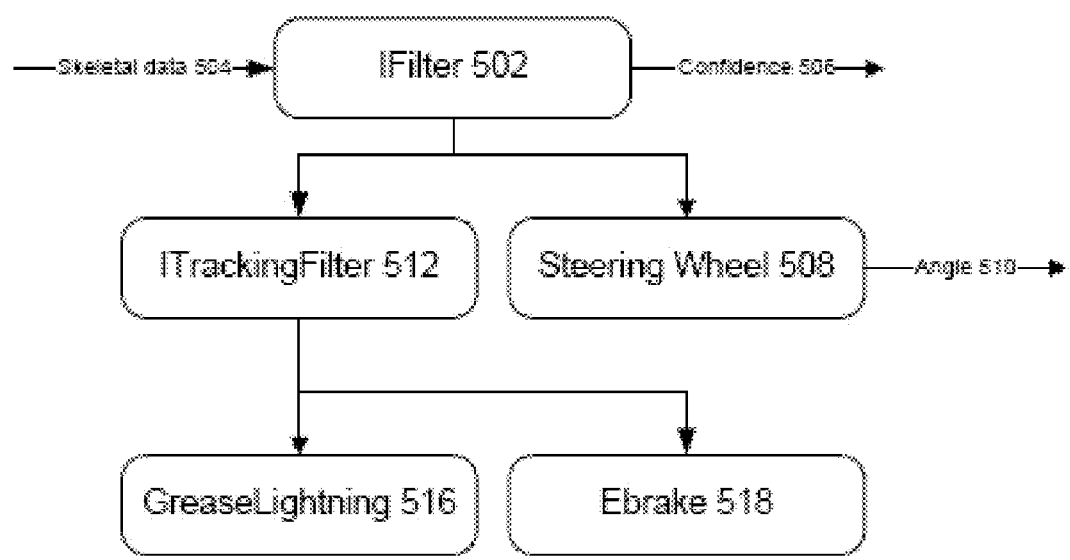

FIG. 5B depicts a more complex gesture that stacks filters 418 onto the gesture filter of FIG. 5A. In addition to IFilter 502 and SteeringWheel 508, there is an ITracking filter 512 that receives position data 504 from IFilter 502 and outputs the amount of progress the user has made through a gesture 514. ITracking 512 also feeds position data 504 to GreaseLightning 516 and EBrake 518, which are filters 418 regarding other gestures that may be made in operating a vehicle, such as using the emergency brake.

FIG. 6 depicts an example gesture that a user 602 may make to signal for a "fair catch" in a football video game. These figures depict the user at points in time, with FIG. 6A being the first point in time, and FIG. 6E being the last point in time. Each of these figures may correspond to a snapshot or frame of image data as captured by a depth camera 402, though not necessarily consecutive frames of image data, as the depth camera 402 may be able to capture frames more rapidly than the user may cover the distance. For instance, this gesture may occur over a period of 3 seconds, and where a depth camera captures data at 40 frames per second, it would capture 60 frames of image data while the user 602 made this fair catch gesture.

Figure 6A:
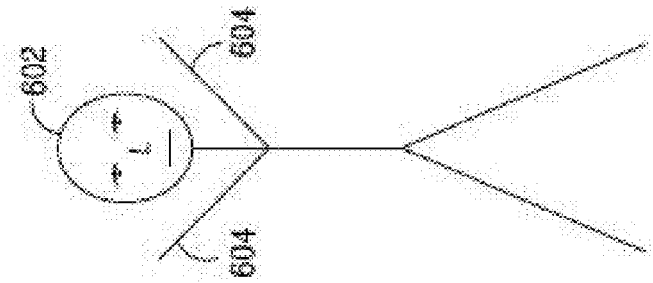
FIGS. 6A, 6B, 6C, 6D and 6E illustrate an example gesture that a user 502 may make to signal for a "fair catch" in football video game.
Figure 6B:
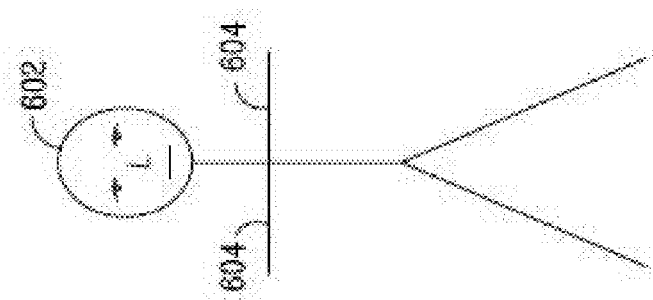
Figure 6C:
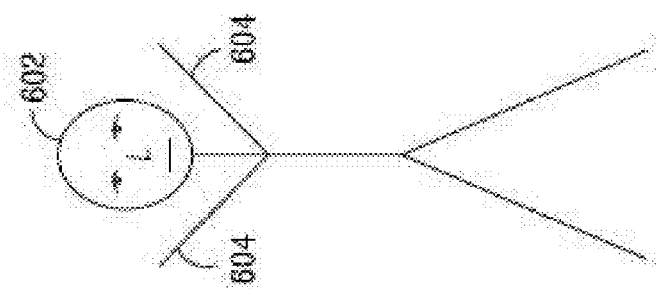
Figure 6D:
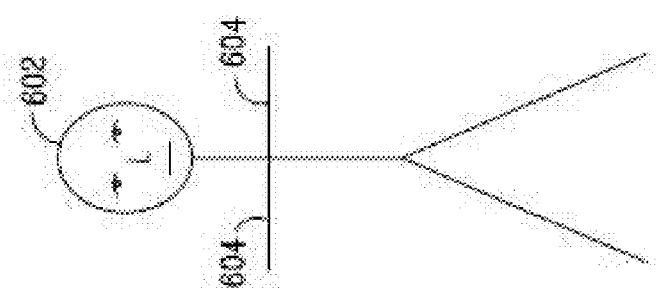
Figure 6E:
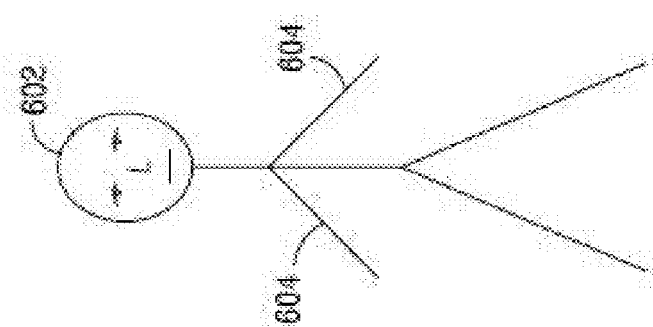

In FIG. 6A, the user 602 begins with his arms 604 down at his sides. He then raises them up and above his shoulders as depicted in FIG. 6B and then further up, to the approximate level of his head, as depicted in FIG. 6C. From there, he lowers his arms 604 to shoulder level, as depicted in FIG. 6D, and then again raises them up, to the approximate level of his head, as depicted in FIG. 6E. Where a system captures these positions by the user 602 without any intervening position that may signal that the gesture is cancelled, or another gesture is being made, it may have the fair catch gesture filter output a high confidence level that the user 602 made the fair catch gesture.

FIG. 7 depicts the example "fair catch" gesture of FIG. 5 as each frame of image data has been parsed to produce a skeletal map of the user. The system, having produced a skeletal map from the depth image of the user, may now determine how that user's body moves over time, and from that, parse the gesture.

In FIG. 7A, the user's shoulders 310, are above his elbows 306, which in turn are above his hands 302. The shoulders 310, elbows 306 and hands 302 are then at a uniform level in FIG. 7B. The system then detects in FIG. 7C that the hands 302 are above the elbows, which are above the shoulders 310. In FIG. 7D, the user has returned to the position of FIG. 7B, where the shoulders 310, elbows 306 and hands 302 are at a uniform level. In the final position of the gesture, shown in FIG. 7E, the user returns to the position of FIG. 7C, where the hands 302 are above the elbows, which are above the shoulders 310.

While the capture device 20 captures a series of still images, such that in any one image the user appears to be stationary, the user is moving in the course of performing this gesture (as opposed to a stationary gesture, as discussed supra). The system is able to take this series of poses in each still image, and from that determine the confidence level of the moving gesture that the user is making.

In performing the gesture, a user is unlikely to be able to create an angle as formed by his right shoulder 310a, right elbow 306a and right hand 302a of, for example, between 140° and 145°. So, the application using the filter 418 for the fair catch gesture 426 may tune the associated parameters 428 to best serve the specifics of the application. For instance, the positions in FIGS. 7C and 7E may be recognized any time the user has his hands 302 above his shoulders 310, without regard to elbow 306 position. A set of parameters that are more strict may require that the hands 302 be above the head 310 and that the elbows 306 be both above the shoulders 310 and between the head 322 and the hands 302. Additionally, the parameters 428 for a fair catch gesture 426 may require that the user move from the position of FIG. 7A through the position of FIG. 7E within a specified period of time, such as 1.5 seconds, and if the user takes more than 1.5 seconds to move through these positions, it will not be recognized as the fair catch 418, and a very low confidence level may be output.

Figure 8:
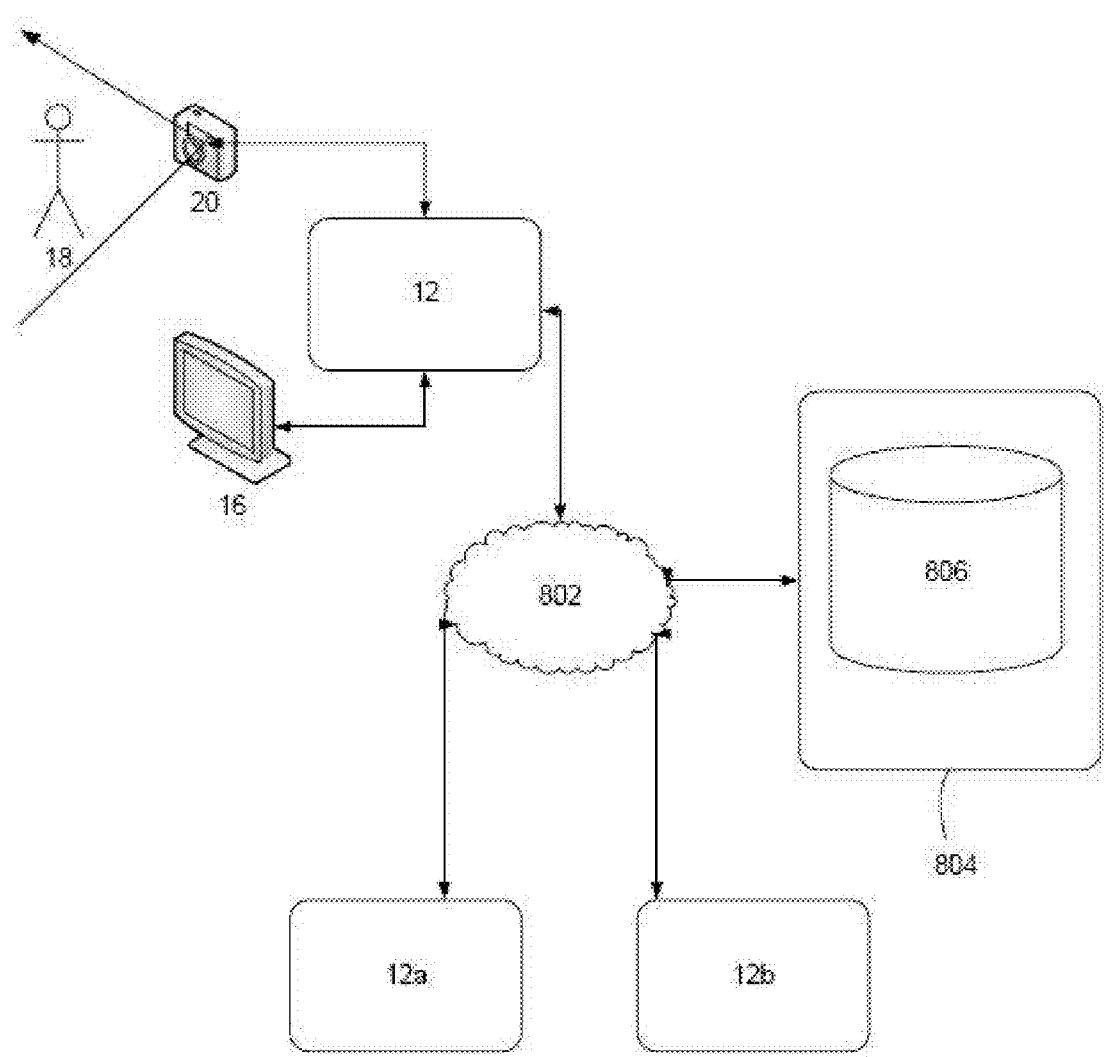
FIG. 8 illustrates an example system for practicing the techniques of the present disclosure.

FIG. 8 illustrates an example environment in which localized gesture aggregation may be performed.

As shown, multiple users 18a-b may each be operating his or her own target recognition, analysis, and tracking system (like the system 10 shown in FIGS. 1A-2), each of which has its own computing environment 12a-b. In an embodiment, each such user may opt in to a "localized gesture aggregation" feature in which as the user performs gestures, information about those gestures, or parts thereof, is recorded and sent to a server 804 across a communications network 802 where the information is stored along with corresponding demographic information about the user. In embodiment, the recordings of gestures may comprise data about the gestures, such as a skeletal map representation of a user as he performs the gesture, or the outputs of a corresponding gesture filter over time as he performs the gesture.

Demographic information may comprise either user-stated information or gathered user information. User-stated information may include age, sex, location, nationality, language, and/or a user-assigned rating for an application. Gathered user information may comprise an internet protocol (IP) address, expertise, friends on an online multi-player system, a currently-executing application, a computing system used by the user, and/or a previously-executed application.

From an IP address, an approximate location of the user may be established. The user's expertise may be determined by his demonstrated ability at other applications, for instance his ranking on a leader-board, his earned in-game trophies or accomplishments, or in head-to-head match play.

Server 804 receives the recorded gesture information and stores it with the corresponding demographic information in a gesture lookup component 806. In an embodiment, the demographic information for a user is sent to server 806 only when new or modified. In an embodiment, the demographic information is sent to the server 806 each time a recorded gesture is sent to the server. In an embodiment, gesture lookup component 806 comprises a database that stores correlations between demographic information and recordings of gestures made by users. In an embodiment, gesture lookup component 806 stores correlations between demographic information and gesture filters and/or gesture filter parameter(s).

As further illustrated in FIG. 8, user 18 uses gestures as input to an application executing on computing environment 12. To use these gestures as input, his body position and motions are captured by capture device 20, which communicates with computing environment 12, as described above. Output from computing environment 12 is displayed to user 18 on display device 16.

Computing device 12 may receive demographic information about the user, after the user has consented to the gathering of such information. When the user begins executing the application on computing device 12, computing device 12 may communicate with server 804 across communications network 802 to determine, based on the demographic information and recorded gestures of other users in gesture lookup component 806, a gesture filter and/or parameter(s) that user 18 is likely to have an inclination towards performing.

In greater detail, computing environment 12 may send the demographic information about user 18 to server 804, and in an embodiment, also information about the application (such as its title) or gesture filters likely to be used by the application. In an embodiment, the demographic information is sent to server 804 once as it is created or modified. Server 804 may then use at least part of this demographic information as a query to gesture lookup component 806 for a gesture filter, parameter(s) and/or a recording of a user performing the gesture that corresponds to a user that has the same or similar demographic information to the user. The looked-up gesture filter, parameter(s) and/or recording of a user performing the gesture may then be returned as the result of the query. The server 804 may then send the result of the query, such as a gesture filter, a gesture filter and parameters for that filter, or parameters for a gesture filter already installed on the computing environment 12 to the computing environment 12. The computing environment 12 may then incorporate the received result into its gesture recognizer engine. For example, if the returned result is a new gesture filter, the new filter would be installed in the gesture recognizer engine. A new gesture filter may replace an existing filter. If only parameters for an existing filter were received, then those parameters would be added to or set on the existing filter. Or the received information could be used to otherwise modify an existing filter(s) and/or parameters.

A gesture filter and/or parameters(s) returned by the gesture lookup component 806 may comprise a likely or most-likely useful filter and/or parameter(s) for user 18. A filter may be likely useful because user 18 has an inclination to be able to correctly perform the gesture corresponding to the filter and/or parameter(s) of the filter, or find it easy to learn how to perform the gesture. A user may have an inclination to perform a gesture when the way a gesture is performed is the way or close to the way that the user would initially attempt to perform the gesture, whether or not given instruction on how to perform the gesture. For instance, a 16 year-old male with a background in playing baseball may be inclined to perform a "ball pitch" gesture by making an overhand throwing gesture, because that's the motion he would make when trying to make the gesture without any coaching of a way to make it. In contrast, a 16 year-old female with a background in playing softball may be inclined to perform a "ball pitch" gesture by making an underhand throwing gesture, because that's the motion she would make when trying to make the gesture without any coaching of a way to make it.

When the gesture recognizer engine of computing environment 12 has received the likely or most-likely gesture filter and/or parameter(s), and incorporated them, then future motions and or poses that user 18 makes as input to the application, and which are captured by capture device 20, are processed by computing environment 12 with the received likely or most-likely gesture filter and/or parameter(s).

In an embodiment, such as where computing device 12 does not communicate with server 804 across a communications network, computing device 12 may perform the operations of server 804.

Figure 9A:
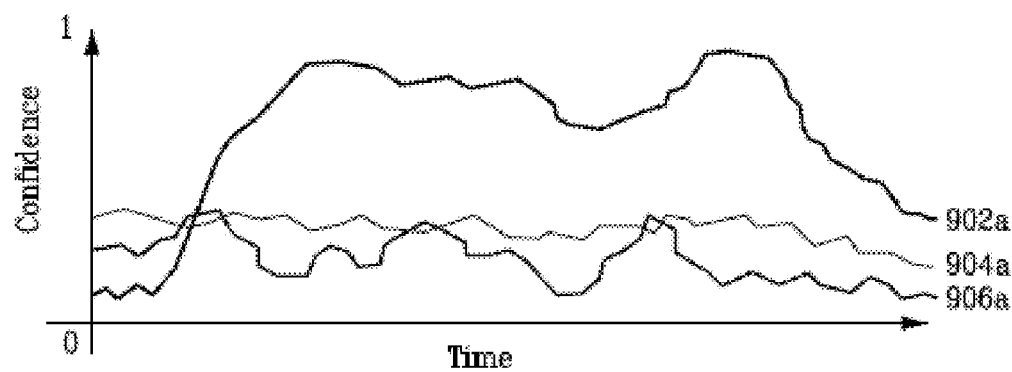
FIGS. 9A, 9B and 9C illustrate exemplary outputs of a plurality of gesture filters in response to different individuals performing a gesture.
Figure 9B:
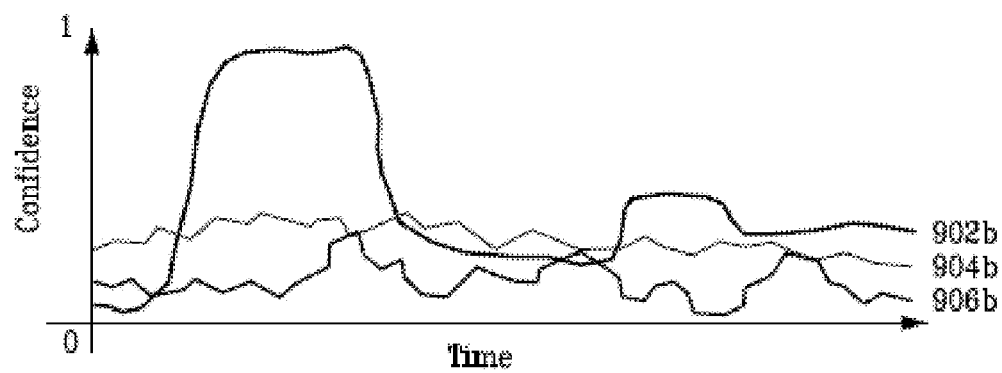
Figure 9C:
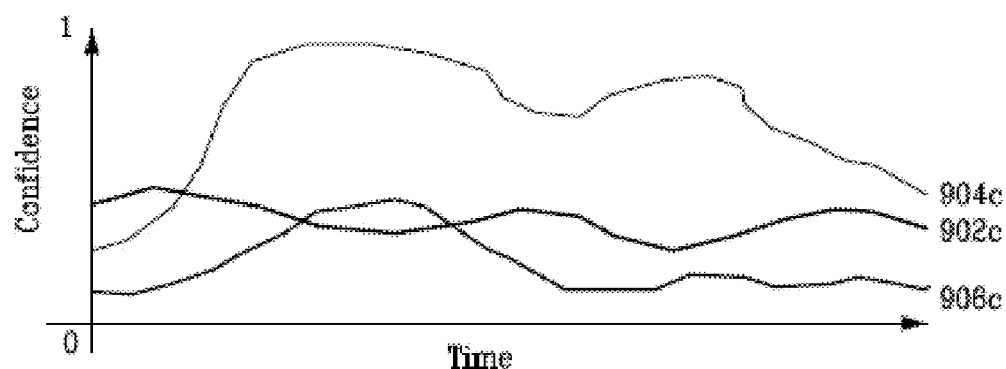

FIGS. 9A, 9B and 9C illustrate exemplary outputs of a plurality of gesture filters in response to different individuals performing a gesture. The graphs chart the confidence level of a gesture filter that a corresponding gesture has been performed by the user over time. The three outputs 902, 904 and 906 all correspond to gesture filters for a "wave hello" gesture. The outputs of the three filters are of a "Western hello" gesture filter 902, an "Eastern hello" gesture filter 904, and an "unconventional hello" gesture filter 906.

FIG. 9A depicts the confidence level output of gesture filters 902a-906a as performed by a 25 year-old American female. The "wave hello" gesture that she performs is evaluated by both "Eastern hello" gesture filter, and the "unconventional hello" gesture filter to have a low confidence level 904a, 906a. Her movement is evaluated by "Western hello" gesture filter to have a relatively high confidence level over a relatively sustained period of time 902a. Where this is a common set of outputs for 25 year-old American female users, it may be considered that using the "Western hello" gesture filter with a set of parameters that require a sustained high level of confidence is appropriate for those users with such demographics.

FIG. 9B depicts the confidence level output of gesture filters 902a-906a as performed by a 25 year-old American male. Here, it may be that the output of the "Western hello" gesture filter 902b is the one that peaks relative to the other outputs 904b, 906b, but that it peaks for a shorter period of time than does the output of the "Western hello" filter 902a when performed by the 25 year-old American female of FIG. 9A. This may be, for instance, because the male attempts to perform the gesture for a shorter period of time than the female of FIG. 9A, or because the male attempts to perform the gesture for a similar period of time, but only successfully performs it for a shorter period of time than the female of FIG. 9A. From this, it may be determined that the "Western hello" gesture filter may be the most likely appropriate filter to provide to 25 year-old Americans, but the parameters of the filter should be modified based on the sex of the user, with the parameters of the filter for a male user allowing for a shorter duration of performing the gesture.

FIG. 9C depicts the confidence level output of gesture filters 902c-906c as performed by a 25 year-old Korean male. Here, his physical movement to create the "wave hello" gesture does not cause a high confidence level to be output by the "Western hello" gesture filter 902c like the users of FIGS. 9A and 9B, but a high confidence level to be output by the "Eastern hello" gesture filter 904c. The output of the "unconventional hello" gesture filter 906c remains low as it did in FIGS. 9A and 9B. It may be determined that for this user, and should users with similar demographics produce similar results, that the "Eastern hello" gesture filter may be the most appropriate gesture filter to provide to 25 year-old Korean males.

Some demographic information may correlate with or affect which parameter or parameters to use for a gesture filter, while other demographic information may correlate with or affect which gesture filter to use in the first place. In these three examples, it may be determined that the sex of the user correlates with or affects only which parameters to use for a given gesture filter, while the nationality of the user may be determined to correlate with or affect which gesture filter to use to match a given gesture (in this case, the "wave hello" gesture).

Figure 10:
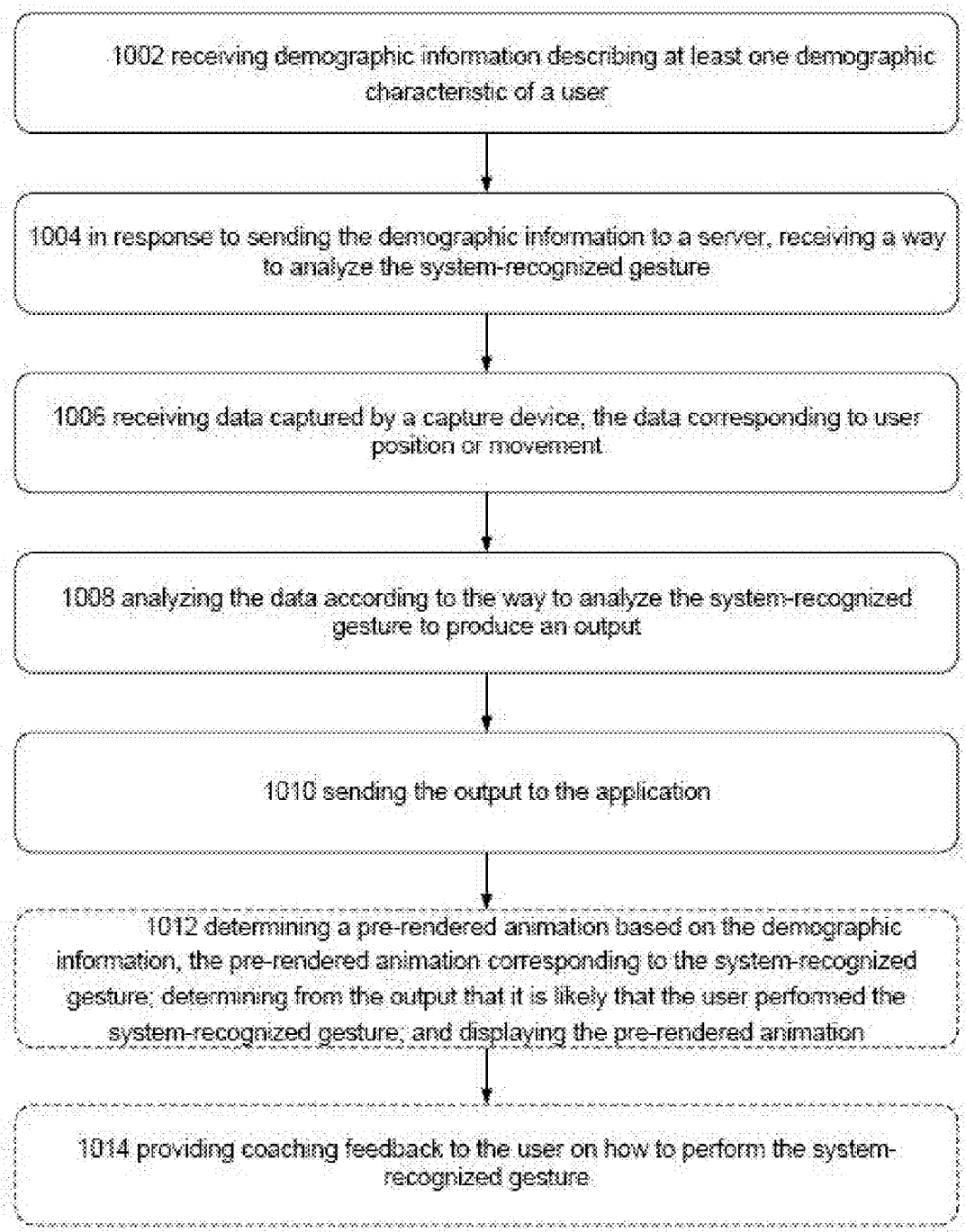
FIG. 10 illustrates exemplary operational procedures for localized gesture aggregation.

FIG. 10 illustrates exemplary operational procedures for localized gesture aggregation.

Operation 1002 depicts receiving demographic information describing at least one demographic characteristic of a user.

In an embodiment, the user opts in before any of his demographic information is gathered, or before any of his demographic information is later used to make determinations regarding the user's inclinations or predispositions. In an embodiment, this may be done explicitly, such as by the user affirmatively clicking on an "accept" button after having read a description of how the demographic information will be used. In an embodiment, this may be done implicitly, where the user inputs such demographic information, such as age or location, upon being notified of how this information may be used should he choose to input it.

Operation 1004 depicts in response to sending the demographic information to a server, receiving a way to analyze the system-recognized gesture.

In an embodiment, receiving a way to analyze the system-recognized gesture comprises adjusting the parameters or outputs of a plurality of gesture filters (including the most-likely gesture filter), so as to make it more likely that the most-likely gesture filter will produce an output corresponding to a high likelihood that the corresponding gesture was performed (such as a high confidence level output) than a second gesture filter occurred when the user performs the user-performed gesture. It may be that the two gesture filters here correspond to the same gesture, or that the two gesture filters correspond to different gestures.

In an embodiment, this way to analyze the system-recognized gesture comprises a likely or most-likely gesture filter and corresponding parameter(s) combination of a gesture lookup component. The gesture lookup component may comprise a plurality of demographic information combinations, a plurality of gesture filters and corresponding parameter(s) combinations, and an indication that correlates each demographic information combination with a gesture filter and corresponding parameter(s) combination.

In an embodiment, upon supplying one or more demographics to the gesture lookup component, the gesture lookup component returns the appropriate gesture filter and corresponding parameter(s) combination. In an embodiment, determining the most-likely gesture filter and corresponding parameter combination further comprises selecting a set of parameters from a plurality of sets of parameters corresponding to the gesture filter. This may occur, for instance, where a gesture filter has already been determined, only the corresponding parameter(s) remain unknown. In an embodiment, a gesture filter is returned without corresponding parameters, and previously known parameters, default parameters for the gesture filter, or parameters to be determined later may be used.

In an embodiment, selecting a set of parameters from a plurality of sets of parameters corresponding to the gesture filter further comprises selecting a set of parameters corresponding to performing the user-performed gesture well upon determining based on the at least one demographic information that the user is likely to perform the gesture well; and selecting a set of parameters corresponding to performing the user-performed gesture poorly upon determining based on the at least one demographic information that the user is likely to perform the gesture poorly. For example, it may be determined that people over the age of 10 years are likely better at fine-grain motor movements than those younger than 10 years old. With regard to a gesture filter that when optimally performed involves fine-grain motor movements, and where the user's demographic information includes his age, and that age is greater than 10 years, it may be determined that the parameters for this gesture filter may be "tight"—that they are less tolerant of deviation from an optimal performance of the gesture, because the user is more likely to be able to closely approximate the optimal performance. Likewise, with regard to the same gesture filter, and the user's demographic information indicates that he is younger than 10 years old, it may be determined that the parameters for this gesture filter may be "loose"—that they are more tolerant of deviation from an optimal performance of the gesture, because this user is less likely to be able to closely approximate the optimal performance.

Other demographic information may be used to determine whether parameters should be "tight" or "loose," such as the user's demonstrated expertise, or lack thereof, in using another application, such as one that is similar to the present application (e.g. the prior application is a driving game and the present application is a different driving game). Where there are multiple gesture filters that correspond to a single gesture, a "tight" or "loose" gesture filter may be preferred over the others based on similar principles to the above.

In an embodiment, data in the gesture lookup component is gathered from other users. For instance, a second user using another computing environment 12 may be captured by a capture device as he performs one or more gestures. Where that second user has affirmatively opted in to allowing such to take place, data about those gestures along with demographic information about the second user may be stored in the lookup package. The data about the second user's gestures may comprise image data of the user performing all or a subset of the gesture, some representation of that performed gesture, such as the movement of a corresponding skeletal map over time, or the output(s) of a gesture filter corresponding to that gesture.

In an embodiment, determining a most-likely gesture filter and corresponding parameter combination based on at least one demographic information includes determining a most-likely gesture filter and corresponding parameter combination based on a weighted-decision function taking at least one demographic information as an argument. It may be that not all demographic information is equal when it comes to determining a most-likely gesture filter and corresponding parameter combination. It may be that preferred language is significantly more likely to affect a user's inclination than language. For instance, a 25 year-old male who prefers to speak Korean and is located in America may be much more likely to share inclinations on how to perform gestures with a 25 year-old male who prefers to speak Korean and lives in Korea than with a 25 year-old male who prefers to speak American English and lives in America. Using such knowledge, a weight may be applied to one or more of the demographic information, and that weight may be used in determining the most-likely gesture filter and corresponding parameter combination.

In an embodiment, a statistical algorithm is used to determine a most-likely gesture filter and corresponding parameter combination. In an embodiment, the statistic algorithm comprises Bayesian probability. Bayes' formula may be expressed as P(H|D)=P(D|H)·P(H)/5P(D). In this equation, H represents a hypothesis and D represents the data. Given that P(H) is the probability that the hypothesis is correct before the data is seen. P(D|H) is the conditional probability of seeing data given that the hypothesis is true (the likelihood that the hypothesis is true). P(D) is the marginal probability of D. P(H|D) is the posterior probability—the probability that the hypothesis is true, given the data and the previous state of belief about the hypothesis.

The probability that a person will make a "wave hello" gesture using the "Western hello," "Eastern hello," or "unconventional hello" wave may then be calculated for an individual. Let the user be a 25 year-old American male. Let 25 years-old have a conditional probability (P(D|H)) of 0.1 (on a scale that ranges from 0 to 1, inclusive, where 0 represents certainty that the user will not make the gesture and 1 represents certainty that the user will make the gesture), male have a probability of 0.5 and American have a probability of 0.8. Further, let the probability of such demographics occurring in the user population of the system (P(H)) be 25 years-old at 0.05, male at 0.5 and American at 0.3. Using that information, P(D) may be computed over all hypotheses (Western hello, Eastern hello, and unconventional hello) as $$P(D) = \sum_i P(D, H) = \sum_i P(D \mid Hi)P(Hi).$$

Using that equation, the probability of the "Western hello" hypothesis may be calculated for each of the three pieces of demographic information—age, sex, and nationality. From those individual probabilities of "Western hello" for each piece of demographic information, the compound probability that the user with all of these pieces of demographic information may be combined by combining these individual probabilities as $$p = \frac{p1 \cdot p2 \cdot \ldots \cdot pN}{p1 \cdot p2 \cdot \ldots \cdot pN + (1-p1) \cdot (1-p2) \cdot \ldots \cdot (1-pN)}.$$

As more user information is received from different users regarding their gesture inclinations and their demographic information, a more accurate model may be formed, for whatever statistical model is used, and a likely or most-likely gesture filter and/or parameter(s) may be provided to the user.

In an embodiment, determining the most-likely gesture filter and corresponding parameter combination of a gesture lookup component further comprises determining a gesture filter and corresponding parameter combination of the gesture lookup component that the user is most likely to cause to output a high confidence level for the longest period of time in response to the user performing the user-performed gesture. Given the "Western hello," "Eastern hello," and "unconventional hello" gesture filters of FIG. 9, there may be a user who, through his movements causes all three gesture filters to output a high confidence level for some period of time. If that user causes the "Western hello" and "Eastern hello" gesture filters to output a high confidence level for a relatively short period of time, and causes the "unconventional hello" gesture filter to output a high confidence level for a relatively long period of time, even though all three gesture filters output a high confidence level for some period of time, it may be determined that the most-likely gesture filter for this user is the "unconventional hello" because it output a high confidence level for the longest period of time in response to the user's movement.

In an embodiment, differences in at least one of the demographic information between two users may cause it to be determined that the same gesture filter should be used for both users, but with different parameters. In the example of FIG. 9, the 25 year-old American female of FIG. 9A and the 25 year-old American male of FIG. 9B are both most likely to have an inclination to the same gesture filter—the "Western hello"—but benefit from different parameters, as the female is able to produce a relatively sustained high output level whereas the male is able to produce only a relatively brief high output level. So, for these two users, their difference in sex results in the same most-likely gesture filter, but different parameters for that gesture filter to capture the differences in how they perform the corresponding gesture.

In an embodiment, differences in at least one of the demographic information between users may cause it to be determined that a different gesture filter should be used for each user. In the example of FIG. 9, the 25 year-old American male of FIG. 9C and the 25 year-old Korean male of FIG. 9C are most likely to have an inclination to different gesture filters—the American to the "Western hello" gesture filter and the Korean to the "Eastern hello" gesture filter. So, in contrast to between the female and male of FIGS. 9A-B, who were most likely to be inclined towards the same gesture filter but with different parameters, here, the American and Korean of FIGS. 9B-C are most likely to be inclined towards different gesture filters.

Operation 1006 depicts receiving data captured by a capture device, the data corresponding to user position or movement. The capture device may capture a scene that contains all of the user, such as from the floor to the ceiling and to the wall on each side of a room at the distance in which the user is located. The capture device may also capture a scene that contains only part of the user, such as the user from the abdomen up as he or she sits at a desk. The capture device may also capture an object controlled by the user, such as a prop camera that the user holds in his or her hand.

Operation 1008 depicts analyzing the data according to the way to analyze the system-recognized gesture to produce an output. In an embodiment where a gesture recognizer architecture is used, this may comprise analyzing the data with a gesture filter and corresponding parameter(s) as dictated by the received way to analyze the system-recognized gesture.

Operation 1010 depicts sending the output to the application. Where the present operations are performed by the application, the output may be sent to a component of the application that takes processed user input and maps it to in-application actions.

Optional operation 1012 depicts determining a pre-rendered animation based on the demographic information, the pre-rendered animation corresponding to the system-recognized gesture; determining from the output that it is likely that the user performed the system-recognized gesture; and displaying the pre-rendered animation. An application may display a pre-rendered animation in response to a user-performed gesture. For instance, where the user has a displayed avatar, performing a "wave hello" gesture may trigger the application to display the avatar making a pre-rendered "wave hello" animation, as opposed to a more true reflection of how the user performed the gesture (such as by taking a skeletal map of the captured image data, and mapping that skeletal map to the avatar, such that user movement in his space is more directly represented by the avatar, whether or not that movement comprises a gesture corresponding to a gesture filter). Here, where there are multiple ways in which an idea (such as "wave hello") may be expressed through gestures, there may be different pre-rendered animations corresponding to these multiple ways.

For instance, it may be determined that males are likely to express the idea of "hello" by waving hello, which for them usually comprises making large sweeping motions of the arm, rotating at the elbow and locking the wrist joint, and that females are likely to express the idea of "hello" by also waving hello, but for them usually comprises making smaller sweeping motions of the arm with a loose wrist joint. Thus, to improve user experience by increasing the likelihood that pre-rendered animations more closely match the user's actual movement, where the user's demographic information indicates that he is a male, when he performs the "wave hello" gesture, an animation involving a large sweeping motion and a locked wrist joint may be displayed.

Optional operation 1014 depicts providing coaching feedback to the user on how to perform the system-recognized gesture. Where a user is either new to using the application or has attempted to use it and had a low degree of success in performing gestures correctly, it may be determined that the user could benefit from feedback on how to perform the gesture, such as coaching feedback. In order to aid the user in interacting with the application as easily as possible, it may be determined to provide that feedback based on the most-likely gesture filter that the user will have an inclination to perform, or find it easiest to develop the skill to perform.

Conclusion

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. In a computing environment that captures information about movement of a user, and analyzes whether the user has performed a gesture, a method comprising:

receiving demographic information describing at least one demographic characteristic of a user;

selecting a parameter for a gesture filter or the gesture filter based at least in part on the received demographic information of the user, the gesture filter representing a gesture, the parameter affecting how the gesture filter interprets depth image data to produce an output; and sending an indication of the parameter for the gesture filter, or an indication of the gesture filter, to a component that uses the gesture filter to interpret the depth image data, the gesture filter being configured to receive depth image data indicative of motion or pose by the user and produce an output from the depth image data.

2. The method of claim 1, further comprising:
receiving demographic information of a second user and information about a way that the second user performed the gesture corresponding to the gesture filter; and
storing the demographic information of the second user and the information about the way that the second user performed the gesture.

3. The method of claim 2, further comprising:
storing the demographic information of the second user in response to determining that the second user has opted in to having demographic information stored.

4. The method of claim 2, wherein the information about the way that the second user performed the gesture comprises:
one or more depth images of the second user performing the gesture, a representation of how the user performed the gesture, and an output analyzing how the user performed the gesture.

5. The method of claim 1, wherein selecting a parameter for a gesture filter or the gesture filter based at least in part on the received demographic information of the user comprises:
selecting a parameter corresponding to the user performing the gesture well in response to determining, based on the demographic information, that the user is likely to perform the gesture well.

6. The method of claim 1, wherein the output comprises a confidence level, and selecting a parameter for a gesture filter or the gesture filter based at least in part on the received demographic information of the user comprises:
selecting the parameter for a gesture filter or the gesture filter such that analyzing the depth image data with the gesture filter produces an output with a high confidence level.

7. The method of claim 1, wherein selecting a parameter for a gesture filter or the gesture filter comprises:
selecting the parameter or the gesture filter such that processing the depth image data with the gesture filter produces an output indicative of it being more likely that the gesture occurred than an output produced by a processing the depth image data with a second gesture filter.

8. The method of claim 1, wherein the output comprises: a likelihood that the user has performed the gesture.

9. The method of claim 1, wherein selecting a parameter for a gesture filter or the gesture filter based at least in part on the received demographic information of the user is performed in response to:
determining that the user has opted in to having the user's demographic information used.

10. The method of claim 1, wherein selecting a parameter for a gesture filter or the gesture filter based at least in part on the received demographic information of the user comprises:
selecting the parameter for the gesture filter or the gesture filter based on a weighted-decision function taking at least some received demographic information as an argument.

11. The method of claim 1, wherein selecting a parameter for a gesture filter or the gesture filter based at least in part on the received demographic information of the user comprises:
selecting a parameter corresponding to the user performing the gesture poorly in response to determining, based on the demographic information, that the user is likely to perform the gesture poorly.

12. A system comprising:
a processor; and
a memory communicatively coupled to the processor when the system is operational, the memory bearing processor-executable instructions that, when executed by the processor, cause the system to at least:
receive information representing a gesture performed by a user, the information having been generated from a depth image captured by a depth camera;
compare the information to information representing a known gesture that may be performed by users;
determine, based on the comparison, that it is likely that the user has performed the known gesture;
receive demographic information describing at least one demographic characteristic of the user; and
store information correlating the received demographic information with the information representing the known gesture.

13. The system of claim 12, wherein the demographic information comprises: user-stated information, or gathered user information.

14. The system of claim 13, wherein the user-stated information comprises:
age, sex, location, nationality, language, or a user-assigned rating for an application.

15. The system of claim 13, wherein the gathered user information comprises:
an internet protocol (IP) address, expertise, friends on an online multi-player system, a currently-executing application, a computing system used by the user, or a previously-executed application.

16. A computer-readable storage medium for customizing a system-recognized gesture based on demographic information of a user, comprising computer-readable instructions that, when executed on a computer, cause the computer to perform operations comprising:
receiving demographic information describing a demographic characteristic of a user;
in response to sending the demographic information to a server, receiving a parameter for a gesture filter or the gesture filter, the gesture filter representing the system-recognized gesture, the parameter affecting how the gesture filter interprets data to produce an output;
receiving depth image data captured by a depth image capture device, the depth image data being indicative of a position or movement of the user; and
analyzing the depth image data with the gesture filter to produce an output.

17. The computer-readable storage medium of claim 16, further comprising computer-readable instructions that, when executed on the computer, cause the computer to perform operations comprising:
determining a pre-rendered animation based on the demographic information, the pre-rendered animation corresponding to the system-recognized gesture;
determining from the output that it is likely that the user performed the system-recognized gesture; and
displaying the pre-rendered animation.

18. The computer-readable storage medium of claim 17, further comprising computer-readable instructions that, when executed on the computer, cause the computer to perform operations comprising:
providing feedback to the user.

19. The computer-readable storage medium of claim 18, wherein providing feedback to the user comprises:
providing coaching feedback to the user on how to perform the system-recognized gesture.

* * * * *